July 22, 1969     W. P. STUCK     3,456,676
TIRE VALVE
Filed Jan. 17, 1966
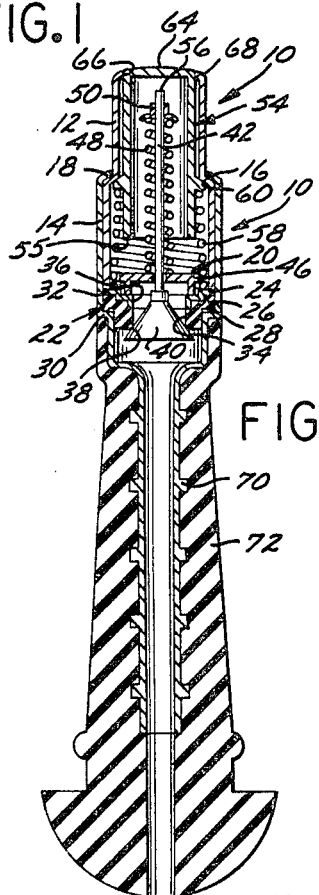
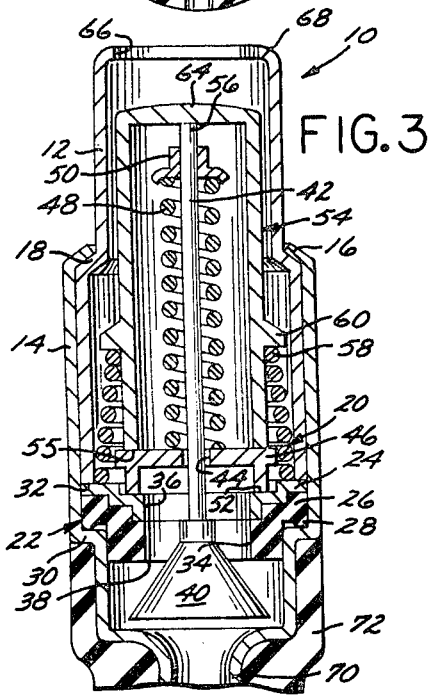
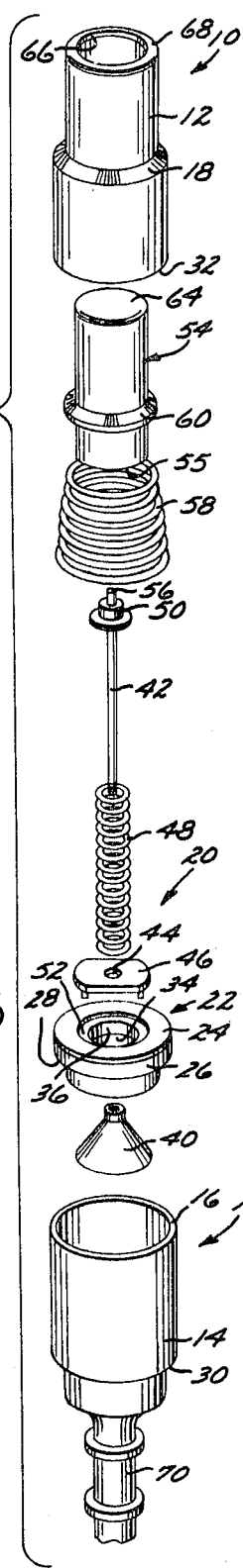
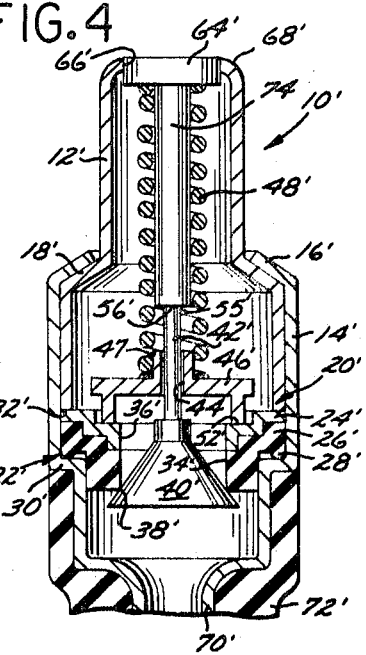
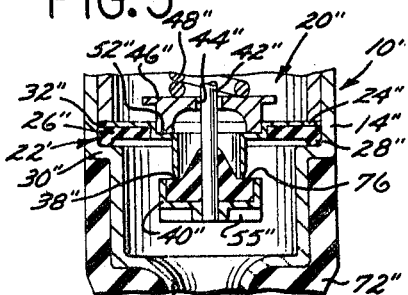
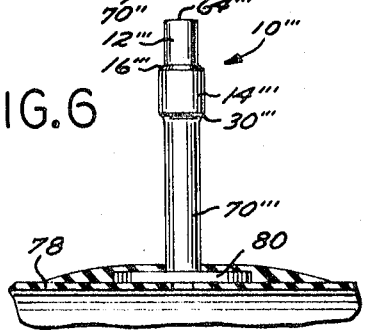
INVENTOR.
WILLIAM P. STUCK 3,456,676
TIRE VALVE
William P. Stuck, 2451 Granada Ave.,
Long Beach, Calif. 90815
Filed Jan. 17, 1966, Ser. No. 521,033
Int. Cl. F16k 15/20
U.S. Cl. 137—223                                6 Claims

ABSTRACT OF THE DISCLOSURE

The specification discloses an improved valve which comprises a hollow valve housing including an inner sleeve portion and an outer mating sleeve portion fastened in longitudinally fixedly engaged, retained, and sealed relationship and having an inner valve assembly positioned therewithin and including valve seat means taking the form of ring means peripherally sealingly engaged with respect to the inner sleeve portion of the valve housing and having an inwardly facing valve-engageable circular valve seat engagement edge surrounding and defining a circular, outwardly directed valve aperture provided with and centrally reciprocatably mounting a valve member and a valve shaft longitudinally centrally outwardly extending through the aperture of the valve seat for axial movement outwardly toward, and inwardly away from, the valve seat engagement edge into and out of sealing engagement therewith, respectively. Valve biasing spring means is carried by the valve shaft and is provided with spring abutment means fixedly connecting same with respect to an outer portion of the valve shaft and an outer surafce of the valve seat means for normally biasing the valve member into sealed engagement with the valve seat engagement edge. A combination valve-operating plunger means and protective cover means has a closed outer end and is slidably positioned within the valve housing immediately outwardly of an outer end of the valve shaft and the valve biasing spring means for forcible slidable inward movement thereagainst to temporarily disengage the valve member from the valve seat engagement edge.

---

Generally speaking, the present invention relates to valves and, more particularly, in one preferred exemplary form thereof, pertains to an improved air valve for pneumatic tires of either the tubeless type or of the type adapted to carry an inner tube therein, and the invention will be described, for exemplary purposes, in said preferred exemplary form wherein it comprises an air valve for a pneumatic tire. However, it should be clearly understood that the invention is not specifically so limited and may have other uses and applications where such an improved valve is required, and the specific description which follows hereinafter is to be broadly construed in the light of the foregoing statement as to the intended scope of the invention.

Conventional prior art air valves for pneumatic tires usually have a separable inner valve core adapted to be engaged within (usually threadedly engaged within) an outer hollow valve stem or part which is exteriorly provided with threads and which normally threadedly mounts a cap or cover over the open end of said threaded valve stem for effectively closing same. This type of prior art air valve for a pneumatic tire works reasonably well as long as the valve core is tightly and sealingly engaged within the hollow valve stem and as long as no foreign matter has gotten into the interior of the valve stem and/or valve core in a manner such as to interfere with the correct seating of the valve and valve seat for the purpose of providing a positive and complete air seal. In the event that such foreign matter has gotten into the valve stem and/or valve core, it frequently will prevent full seating of the valve member and valve seat in a manner which will provide a slow high-pressure leak and thus cause the tire to gradually lose air pressure until such time as it reaches a relatively low level of air pressure which may result in various types of damage occurring to the tire, which will frequently lead to complete loss of air pressure and a completely flat and, in some cases, irreparably damaged tire. Also, such a loss of tire air pressure may lead to personal injury or death or major property damage as a result of an ensuing accident produced by the tire suddenly going flat while the car is moving rapidly.

Another disadvantage of such a prior art air valve lies in the fact that it has an upwardly directed plunger or valve core shaft which is adapted to be downwardly depressed when the valve is to be temporarily opened for either adding air to the interior of a tire or removing excessive air from the interior of a tire, and this depression of said plunger or valve core shaft is customarily effected by applying some exterior physical object to the outer end of said plunger or valve core shaft for temporarily depressing same. This may be the centrally positioned projecting post on an air pressure hose fitting or the similar centrally positioned projecting post of a pneumatic or air gauge used for determining the air pressure within a tire, or any other physical object exteriorly applied to said plunger or valve core shaft for temporarily depressing same, any of which may damage said rather delicate valve core shaft or plunger in the event that the exterior object applied thereto for depressing same is not applied directly in alignment with the shaft of said plunger. In other words, if there is any angular component in the direction of application of such an exterior valve plunger depressing object, it may bend the shaft of the valve core plunger which, thereafter, will cause the valve member tatached thereto to not seat properly on the valve seat of the valve assembly and thus to produce a slow high-pressure leak having the same disadvantages as enumerated hereinbefore in connection with the above description of the disadvantages of such a slow high-pressure leak produced by the interposition of one or more small particles of foreign matter in and around the valve core of such a prior are valve.

Another disadvantage of such a prior art air valve for a pneumatic tire lies in the fact that the safety cap or cover is threaded over the outer end thereof and is very easily lost once it is removed. This occurs because it is quite easy to forget to replace it after removal and even in the event that it is replaced, it may not be threadedly re-engaged tightly enough on the exteriorly threaded and otherwise open outer end of the hollow valve stem and thus, through the action of vibration thereon, may work itself loose and become disengaged and lost.

In any event, whatever the reason, it will be found that such a conventional completely separable threaded valve stem valve cap or cover of such a conventional prior art air valve for a pneumatic tire is quite often lost, and the outer end of the valve stem is used in uncovered, open condition during substantial amounts of driving of a motor vehicle carried by a plurality of such tires. It will be understood that every time such a motor vehicle having tires with such open valve stem drives through mud, sand, or various other similar loose debris, there is great likelihood that particles of foreign matter may enter the open valve stem and become lodged therewithin adjacent to, in, and around the inner valve core whereby to bring about faulty operation of the valve assembly in the manner referred to hereinbefore.

One reason that such a prior art air valve for a pneumatic tire becomes so easily rendered only partially effective by the introduction of foreign matter is the fact that the valve and valve seat are arranged for substantially flat interfacial contact with each other, and the introduction of only one particle of foreign matter therebetween at only one location will hold the two substantially flat valve and valve seat portions separated by said particle of foreign matter apart and, in some instances, in angularly cocked relationship such as to render a substantial portion of the valve member and valve seat relatively ineffective from the standpoint of providing a positive seal.

The improved valve of the present invention, when used as an air valve for a pneumatic tire, completely meets and overcomes all of the above-mentioned disadvantages of prior art air valves for pneumatic tires because it does not have a separable cap member which may be lost and yet effectively closes the entry opening into the hollow valve stem so as to prevent the undesired entry of foreign matter or particles thereinto. Also, the improved air valve of the present invention has no threads which, therefore, reduces the cost of the complete valve and eliminates the undesirable feature of threads comprising the fact that they tend to collect dirt and debris and are subject to damage.

Also, the improved air valve of the present invention is effectively self-cleaning, since it is so constructed that air pressure passing therethrough cleans the valve member, which, in one preferred form, is conically, or frusto-conically, shaped and, further, since the closure thereof, when the valve is shut off, has what might be termed an effective wiping action tending to clean off the surface of the valve member in the event that any small particle of foreign matter inadvertently had become lodged thereon. In other words, the valve member and valve seat member cooperate in a manner virtually preventing any likelihood of foreign particles, holding them in only semi-sealed or completely unsealed engagement in the undesirable manner of prior art valve and valve seat constructions, as referred to briefly hereinabove.

Also, there is no upwardly directed unsupported plunger or valve shaft of the above-mentioned prior art type which can be damaged by a chuck or other deflection element or projection of an air hose pneumatic fitting, a tire air pressure tester, or other exterior valve opening device in a manner comparable to the frequent damage which occurs to the unsupported upper end of the valve plunger of conventional prior art air valves as referred to briefly hereinbefore.

Furthermore, the novel air valve of the present invention is so constructed as to place the valve member and cooperating valve seat in a completely closed-in, sealed-off position away from any dirt or damage.

Furthermore, the novel air valve of the present invention offers less resistance to the passage of air under pressure therethrough in either direction when the valve assembly is held in open position, thus bringing about faster tire inflation and faster tire deflation, which is particularly important during tire-repairing operations.

The novel air valve of the present invention has no separate inner core in the manner of prior art air valves as referred to hereinbefore, which frequently loosen and cause a pressure leak as referred to hereinbefore.

Furthermore, the novel valve of the present invention comprises a minimum number of parts adapted to be assembled in a very simple manner between an upper and lower, or outer and inner, valve stem portions, which are then sealingly fastened together to subsequently effectively comprise a unitary structure with all parts contained therein so that no parts need to be removed thereafter and no parts can be accidentally lost. In other words, the apparatus provides a simple-to-assemble construction which is of a virtually foolproof and completely-sealed nature after such assembly and which has no parts which can be accidentally lost thereafter and yet which functions as a normally completely-closed valve assembly which is only temporarily opened during the introduction of air (tire inflation) or the egress of air (tire deflation).

With the above points in mind, it is an object of the present invention to provide an improved valve including, but not specifically limited to, an improved air valve for a pneumatic tire, which is of the character referred to herein, which has any or all of the advantages referred to herein, and which includes any or all of the features referred to herein, generically and/or specifically and individually or in combination and which is of extremely simple, inexpensive construction adapted for ready mass manufacture at relatively low cost whereby to be conducive to widespread use thereof, both in tubeless tires and in tube-type tires, and, indeed, wherever such an improved valve is useful or desirable.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, several exemplary embodiments of the invention are illustrated in the hereinbelow-described figures of the accompanying single drawing sheet and are described in detail hereinafter.

FIG. 1 is a greatly enlarged sectional view taken substantially on a vertical central plane passing through one exemplary embodiment of the invention when in fully-assembled operative closed relationship.

FIG. 2 is n exploded view of the various elements of the form of the invention illustrated in central section in FIG. 1 but with said elements being non-sectioned and shown in pictorial, three-dimensional form in FIG. 2.

FIG. 3 is an enlarged fragmentary sectional view similar to the upper portion of FIG. 1 but shows the apparatus when the valve has been temporarily operated into an open relationship for allowing air to pass therethrough in a desired direction in accordance with the differential pressure conditions which exist across the open valve assembly.

FIG. 4 is a fragementary view similar to an upper portion of FIG. 1 but illustrates a slight modification thereof.

FIG. 5 is an enlarged fragmentary view similar to a central portion of FIG. 1 and illustrates a slight modification of the valve seat means and the valve member cooperating therewith.

FIG. 6 is a fragmentary view similar in many respects to a lower portion of FIG. 1 which has been modified for use with an inner tube of a tube-type tire rather than for use with a tubeless-type tire (by attachment to a wheel rim mounting such a tubeless-type tire).

Generally speaking, the novel valve of the present invention, in the exemplary first form thereof wherein it comprises an air valve for a tubeless-type pneumatic tire (and mounting wheel rim), includes a hollow longitudinal valve housing, stem, and casing such as is generally designated by the reference numeral 10 and which, in said exemplary form, comprises an outer or upper sleeve portion 12 and an inner or lower sleeve portion 14 which, during the assembly of the complete air valve, are adapted to be telescopically engaged and then to be positively sealingly locked with respect to each other by having an upper edge 16 of the inner or lower sleeve portion 14 forcibly crimped inwardly into positive locked crimped engagement with respect to an exterior stepped shoulder 18 formed in and carried by the outer or upper sleeve portion 12. This telescopic engagement and subsequent crimping and locking operation is only performed after the rest of the elements or inner portions have been assembled within the two sleeve portions 12 and 14, which inner portions will be described in detail hereinbelow.

The exemplary first form of the invention illustrated in FIGS. 1–3 also comprises an inner valve assembly or means, generally designated by the reference numeral 20, positioned within the previously-mentioned sleeve portions 12 and 14 prior to their being sealingly locked and crimped together in the manner referred to hereinbefore.

The above-mentioned inner valve assembly or means generally designated at 20 comprises what might be generally termed a centrally apertured valve ring or seat assembly, generally designated at 22, which comprises an outer centrally apertured metal ring member 24 and an inner centrally apertured elastomeric or rubber ring member 26 suitably fastened, such as by bonding or otherwise, to the metal ring member 24 whereby to cause said composite ring means 22 to be of an effectively unitary nature.

The rubber ring member 26 of the composite ring means 22 has an outer annular or peripheral valve portion 28 adapted to be peripherally sealingly engaged with respect to an inwardly directed annular shoulder 30, which may be said to effectively comprise a valve seat means, formed within the inner or lower sleeve portion 14. The sealed engagement of said annular valve portion 28 and said shoulder 30 is provided and maintained by contact of the circular bottom edge 32 of the outer or upper sleeve portion 12 with an outer peripheral portion of the metal ring 24. This sealed engagement is maintained by reason of the previously-mentioned inwardly crimped end 16 of the inner or lower sleeve 14 over the exterior shoulder 18 of the outer or upper sleeve portion 12 when the complete valve housing stem and casing 10 is in the fully-assembled form clearly illustrated in FIG. 1.

Said rubber ring portion 26 of the ring means 22 has a central valve aperture 34 defined therein and in vertical alignment with a central aperture 36 defined in the metal ring member 24 and has therearound an inwardly facing or downwardly facing valve-engageable circular valve seat engagement edge 38.

The valve assembly or means 20 also includes a valve member 40 and a longitudinally outwardly or upwardly extending valve shaft 42 which passes centrally outwardly through the aligned valve apertures 34 and 36 and a guide aperture 44 in an overlying spring abutment stool member 46 whereby to effectively centrally and reciprocatably mount said valve member 40 for axial movement inwardly or downwardly away from, and outwardly or upwardly toward, said valve seat engagement edge 38 and out of and into sealed engagement therewith, respectively—said sealed engagement therewith being clearly illustrated in FIG. 1 and the disengaged or open relationship with respect thereto being clearly shown in FIG. 3.

In the example illustrated, the valve member 40 is conical, which has a decided advantage since, irrespective of wear, foreign particles, or any other factor which might normally tend to prevent proper seating of the valve member 40, it will merely be drawn under the action of a valve biasing compression spring means 48 into firm sealing engagement with said valve seat engagement edge 38 irrespective of any wear or of any foreign material which may be present. In other words, the conical shape of the valve member 40 provides an effective self-centering action adapted to be moved outwardly or upwardly under the action of the biasing spring 48 to whatever extent is necessary to provide a firm sealing engagement between the frustoconical valve member 40 and the elastomeric valve seat engagement edge 38 of the valve seat means or ring generally designated at 22. Also, any foreign matter on the frusto-conical valve member 40 will merely tend to be wiped off and not interfere with sealing engagement thereof.

The upper end of the valve biasing spring means 48 is maintained in a fixed position with respect to the valve shaft 42 by a spring abutment means or clamp member 50 fastened to the upper end of the valve shaft 42, while, as previously pointed out, the lower end of the valve biasing spring 48 rests on the lower spring abutment member or stool member 46, which, in turn, rests upon the lower inner annular lip portion 52 of the metal ring 24 whereby to provide an arrangement normally positively biasing the frusto-conical valve member 40 into sealed engagement with the valve seat engagement edge 38.

The exemplary first form of the invention illustrated in FIGS. 1–3 also includes a combination valve-operating plunger and protective enclosing cover means, generally designated at 54 and comprising an inwardly or downwardly open, inverted, outwardly or upwardly closed, hollow, substantially cylindrical cap member slidably positioned within the assembled valve housing, stem, and casing 10 and positioned immediately outwardly, or upwardly, of the outer, or upper, operating end 56 of the valve shaft 42 and valve biasing spring 48 for forcible slidably inward or downward movement thereagainst whenever an exterior valve operating tool, chuck, or projection is applied against the cap member 54 whereby to temporarily disengage the valve member 40 from the valve seat engagement edge 38 and to open the valve assembly or means 20 to any desired degree, such as is indicated in FIG. 3, for the purpose of forcibly causing air to flow downwardly therethrough as viewed in FIG. 3 and into the interior of a tire (not shown) for tire inflation purposes or for allowing air to flow in the opposite direction for tire deflation purposes.

The valve-operating plunger means or cap member 54 is additionally provided with plunger-biasing compression spring means 58 positioned within the housing, stem, and casing 10 outside of said cap member 54 and positioned below an outer or upper abutment means 60 carried by the cap member 54 and above an outer peripheral portion of the metal ring 24 of the composite ring means 22 comprising the valve seat means, thus providing an arrangement where said plunger-biasing spring means 58 normally biases the closed top end 64 of said valve-operating plunger means and cap 54 outwardly, or upwardly, into an extreme outer or upper position determined by contact of said plunger abutment portion 60 with the inner surface of the previously-mentioned shoulder 18 of the outer sleeve portion 12 and with said plunger or cap member end portion 64 being positioned in and extending through a substantially circular central outer or upper air passage opening 66 defined within an inwardly directed flange or lip 68 formed at the outer or upper end of said outer or upper sleeve portion 12. This provides an arrangement where said outer end cap portion 64 of the plunger 54 effectively normally closes the opening 66 in the manner clearly shown in FIG. 1, but is capable of being downwardly effectively moved into an open position such as is shown in FIG. 3 for effectively opening the valve assembly or means 20 when desired.

It should be noted that the lower or inner edge 55 of the valve-operating plunger means and cap 54 acts as a stop abutment means for limiting the downward travel of said cap 54 and, therefore, the degree of opening movement of the valve 40, by coming into contact with an outer peripheral portion of the previously-mentioned spring abutment or stool member 46, as is clearly shown in FIG. 3. This protects the valve assembly 20 and the biasing springs from damage.

It should be noted that the inner or lower sleeve portion 14 has an extended connection portion 70 which is adapted to be embedded within an elastomeric or rubber engagement member 72. This may be by metal-to-rubber bonding, mechanical engagement therewith, adhesive or cohesive engagement therewith, or otherwise. It should be noted that the engagement member 72 illustrated in FIG. 1 is of a type adapted for removable engagement in pneumatically-sealed relationship with respect to a tubeless tire (normally by way of mounting engagement with a tire-mounting wheel rim), which is not shown since both the engagement member 72, the corresponding portion of a tubeless tire and mounting wheel rim, and the pneumatically-sealed engagement with respect thereto are conventional, well-known in the art, and comprise no part of the basic inventive concept of the present invention.

The various elements of the improved valve are very simply assembled, the valve assembly or means 20 being first assembled from the vertically exploded relationship shown in FIG. 2 and then being placed within the lower valve stem portion 14 and seated upon the lower shoulder 30 thereof. The cap member 54 is placed over the top 56 of the valve shaft 42 with the plunger-biasing spring 58 positioned between the spring abutment shoulder 60 and the top of the valve seat assembly 22 and then the upper stem portion 12 is brought downwardly within the lower stem portion 14 and they are forced together until the upper edge 16 of the lower stem portion 14 lies outwardly adjacent to the shoulder 18 of the upper stem portion 12, after which said upper edge 18 of the lower stem portion 14 is forcibly inwardly crimped into firm mechanically-engaged relationship with the exterior of said shoulder 18 and in a manner which firmly seals the valve seat 22 against the lower shoulder 30. Thus, it will be seen that the complete air valve of FIG. 1 is very simple as to structure and as to assembly.

FIG. 4 illustrates fragmentarily a slight modification of the first form of the invention shown in FIGS. 1-3, and similar parts are designated by similar reference numerals, primed, however. In this modification, the top plunger part 64' is different from that of the first form of the invention as indicated at 64 in FIGS. 1-3 and does not comprise the top of a protective enclosing cap means such as that shown at 54 in FIGS. 1-3 illustrating the first form of the invention. On this modification, said plunger top 64' has an extended, enlarged stop abutment portion 74 which directly engages the top 56' of the valve shaft 42' for a direct operation thereof. Also, said modified plunger top portion 64' of the FIG. 4 form of the invention effectively closes the upper aperture or opening 66' when in the unactuated position shown in FIG. 4 but effectively opens same when actuated downwardly in a manner functionally similar to that of the corresponding plunger and protective covering cap 54 of the first form of the invention as illustrated in FIG. 3. However, since the modified plunger cap 64' has no depending skirt portion defining a hollow enclosing cap in a manner such as that shown at 54 of the first form of the invention illustrated in FIGS. 1-3, no separate plunger biasing spring similar to that shown at 58 in FIGS. 1-3 of the first form of the invention is needed in the FIG. 4 modification of the invention.

Incidentally, it should be noted that the extended enlarged stop abutment portion 74 has a bottom or inner abutment end 55' which acts as a travel-limiting stop when the modified plunger cap 64" is forcibly moved downwardly or inwardly, by coming into contact with the upwardly or outwardly extended boss 47 carried by the top of the spring abutment or stool member 46' and thus functions for protective purposes in a manner similar to the bottom edge 55 of the valve-operating plunger means and cap 34 of the first form of the invention illustrated in FIGS. 1-3. However, in certain forms of the invention, this structure may be modified substantially.

Otherwise, the various elements of the FIG. 4 form of the invention are structurally and functionally similar to the corresponding parts of the first form of the invention illustrated in detail in FIGS. 1-3 and described in considerable detail hereinbefore and, therefore, no further and repetitive detailed description thereof is thought necessary or desirable.

FIG. 5 is a fragmentary view illustrating a slightly different form of valve assembly or means, which is generally designated by the reference numeral 20'' and which functionally corresponds generally to the valve assembly or means 20 of the first form of the invention illustrated in FIGS. 1-3. However, the modified valve assembly or means 20'' of the FIG. 5 modification of the invention is somewhat different in that the valve member 40'' is not frusto-conically shaped in this modification of the invention but has a substantially flat rubber or elastomeric upper contact surface 76 adapted to contact the valve seat engagement edge 38'', which in this modification is of rigid and usually metallic construction, although not specifically so limited, rather than being of rubber or elastomeric construction in the manner of the corresponding part 38 of the first form of the invention illustrated in FIGS. 1-3.

It should be noted that this modification of the invention may also be provided with a protective stop abutment member 55'' taking the form of a stop vane carried below or inwardly of the valve member 40'' and adapted to limit the downward or inward travel of said valve member 40'' for the protective purposes previously described in connection with the first and second forms of the invention.

Various other parts of this modification which functionally or structurally correspond to similar parts of the first form of the invention are also designated by similar reference numerals, doubly primed, however, and because of the similarity, no further detailed description of this modification is thought necessary.

FIG. 6 is a fragmentary view of a further modification of any of the other forms of the invention wherein the lower or inner sleeve portion (such as that shown at 14 in the first form of the invention, for example, although it may apply to any of the modifications of the invention) is not adapted to be connected to an engagement member, such as that shown at 72 of the first form of the invention. Said lower or inner sleeve portion 14''' in FIG. 6 is adapted to be connected to an inner tube, such as that fragmentarily designated in FIG. 6 at 78, with the flared base connection portion 80 being effectively attached either mechanically, cohesively, adhesively, or otherwise, to the inner tube 78. In actual practice, this usually accomplished by vulcanizing said flared base connection portion 80 into an effectively embedded relationship within the rubber of the inner tube 78 and in a manner placing the hollow interior of the inner lower sleeve portion 14''' in interior communication with the interior of the inner tube 78. However, various other attachment means and modes may be employed within the broad scope of the present invention.

It should be noted that the various protective stop abutment means or members such as designated at 55 in the first form of the invention, at 55' in the second form of the invention, and at 55'' in the third form of the invention, may be modified substantially and under certain circumstances in certain forms of the invention may be eliminated entirely with the consequent loss of the protective function thereof, if this is thought to be desirable for purposes of simplification, or the like.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. An improved valve comprising: a hollow valve housing stem and casing including an inner sleeve or stem portion and an outer mating sleeve or stem portion adapted to be fastened in longitudinally fixedly engaged, retained, and sealed relationship with respect to each other, an inner valve assembly or means positioned within said sealingly joined sleeve portions, said inner valve assembly or means comprising a valve seat means taking the form of ring means peripherally sealingly engaged with respect to said inner sleeve portion of said valve housing, stem and casing and having an inwardly facing valve-engageable circular valve seat engagement edge surrounding and defining a circular outwardly directed valve aperture provided with and centrally and reciprocatably mounting a valve member and a longitudinally extending valve shaft extending centrally outwardly through said aperture of said valve seat for axial movement outwardly toward and inwardly away from said valve seat engagement edge into and out of sealing engagement therewith, respectively; valve biasing spring means carried by said valve shaft and provided with outer spring abutment means fixedly connecting an outer end of said valve biasing spring means with respect to an outer portion of said valve shaft, and provided with an inner spring abutment stool member effectively centrally symmetrically carried immediately outwardly of and in engagement with respect to an outer surface of said valve seat means and fixedly connecting a corresponding inner end of said valve biasing spring means with respect to said valve seat means for normally biasing said valve member into sealed engagement with said valve seat engagement edge, said spring abutment stool member being positioned slightly outwardly spaced from said valve seat means and defining between cutaway edge portions of said stool member and said inwardly spaced valve seat means air-flow openings through which air can freely flow when said valve member is temporarily forcibly unseated from its normal spring-biased sealed engagement with said valve seat engagement edge, said spring abutment stool member being centrally provided with a guide aperture reciprocatably mounting said valve shaft for said axial movement therethrough and effectively comprising valve shaft longitudinal axial movement guiding means for positively preventing transverse displacement or misalignment of said valve shaft during reciprocating movement thereof; stop abutment means positioned for effectively limiting the inward travel of said valve member to a maximum safe valve member excursion limit such as to avoid damaging the valve biasing spring means in the event of the application of excessive valve-opening operating force to the valve member or the application of excessive differential air pressure thereto; and combination valve-operating plunger means and protective cover means having a closed outer end and slidably positioned within said valve housing stem and casing immediately outwardly of an outer end of said valve shaft and said valve biasing spring means for forcible slidable inward movement thereagainst whereby to temporarily disengage said valve member from said valve seat engagement edge; said housing, stem and casing having an inwardly directed flange or lip at an open outer end thereof defining a substantially circular central outer air passage opening, said combination valve-operating plunger means and protective cover means comprising a downwardly open, inverted, upwardly closed, hollow, substantially cylindrical enclosing cap member having a closed outer end slidably positioned within said valve housing, stem and casing outwardly of and protectively enclosing an outer portion of said valve shaft and valve biasing spring for forcible slidable inward movement against an outer end of said valve shaft whereby to temporarily disengage said valve member from said valve seat engagement edge, and including plunger biasing compression spring means positioned within said housing, stem and casing outside of said plunger means and provided with and outwardly abutting outer abutment means fixedly attached with respect to said plunger means and having an inner end of said plunger biasing spring means in engagement with said outer surface of said valve seat means for normally biasing said plunger means outwardly into an extreme outer position with the closed outer end of said plunger means being positioned in and effectively closing the air passage opening at the open outer end of said housing, stem and casing; said stop abutment means comprising a lower terminal edge of said combination valve-operating plunger means and protective cover means and a corresponding outer annular surface portion of said spring abutment stool member abuttingly cooperable therewith.

2. An improved valve comprising: a hollow valve housing stem and casing including an inner sleeve or stem portion and an outer mating sleeve or stem portion adapted to be fastened in longitudinally fixedly engaged, retained, and sealed relationship with respect to each other, an inner valve assembly or means positioned within said sealingly joined sleeve portions, said inner valve assembly or means comprising a valve seat means taking the form of ring means peripherally sealingly engaged with respect to said inner sleeve portion of said valve housing, stem and casing and having an inwardly facing valve-engageable circular valve seat engagement edge surrounding and defining a circular outwardly directed valve aperture provided with and centrally and reciprocatably mounting a valve member and a longitudinally extending valve shaft extending centrally outwardly through said aperture of said valve seat for axial movement outwardly toward and inwardly away from said valve seat engagement edge into and out of sealing engagement therewith, respectively; valve biasing spring means carried by said valve shaft and provided with outer spring abutment means fixedly connecting an outer end of said valve biasing spring means with respect to an outer portion of said valve shaft, and provided with an inner spring abutment stool member effectively centrally symmetrically carried immediately outwardly of and in engagement with respect to an outer surface of said valve seat means and fixedly connecting a corresponding inner end of said valve biasing spring means with respect to said valve seat means for normally biasing said valve member into sealed engagement with said valve seat engagement edge, said spring abutment stool member being positioned slightly outwardly spaced from said valve seat means and defining between cutaway edge portions of said stool member and said inwardly spaced valve seat means air-flow openings through which air can freely flow when said valve member is temporarily forcibly unseated from its normal spring-biased sealed engagement with said valve seat engagement edge, said spring abutment stool member being centrally provided with a guide aperture reciprocatably mounting said valve shaft for said axial movement therethrough and effectively comprising valve shaft longitudinal axial movement guiding means for positively preventing transverse displacement or misalignment of said valve shaft during reciprocating movement thereof; stop abutment means positioned for effectively limiting the inward travel of said valve member to a maximum safe valve member excursion limit such as to avoid damaging the valve biasing spring means in the event of the application of excessive valve-opening force to the valve member or the application of excessive differential air pressure thereto; and combination valve-operating plunger means and protective cover means having a closed outer end and slidably positioned within said valve housing stem and casing immediately outwardly of an outer end of said valve shaft and said valve biasing spring means for forcible slidable inward movement thereagainst whereby to temporarily disengage said valve member from said valve seat engagement edge; said two sleeve portions being telescopically engaged and exteriorly inwardly crimped into said longitudinally fixedly engaged, retained, and sealed relationship with respect to each other and defining inwardly crimped sealed junction therebetween, said outer sleeve portion having an inner part thereof of a first diameter and an outer part thereof of a reduced diameter provided with and interconnected by a stepped shoulder adapted to comprise the inner portion of said inwardly crimped sealed junction of said two sleeve portions; said housing, stem and casing having an inwardly directed flange or lip at an open outer end thereof defining a substantially circular central outer air passage opening, said combination valve-operating plunger means and protective cover means comprising a downwardly open, inverted, upwardly closed, hollow, substantially cylindrical enclosing cap member having a closed outer end slidably positioned within said valve housing, stem and casing positioned within said valve housing, stem and casing outwardly of and protectively enclosing an outer portion of said valve shaft and valve biasing spring for forcible slidable inward movement against an outer end of said valve shaft whereby to temporarily disengage said valve member from said valve seat engagement edge, and including plunger biasing compression spring means positioned within said housing, stem and casing outside of said plunger means and provided with and outwardly abutting outer abutment means fixedly attached with respect to said plunger means and having an inner end of said plunger biasing spring means in engagement with said outer surface of said valve seat means for normally biasing said plunger outwardly into an extreme outer position determined by contact of said outer plunger abutment means with said stepped shoulder of said outer sleeve portion of said housing, stem and casing, with the closed outer end of said plunger means being positioned in and effectively closing the air passage opening at the open outer end of said housing, stem and casing; said stop abutment means comprising a lower terminal edge of said combination valve-operating plunger means and protective cover means and a corresponding outer annular surface portion of said spring abutment stool member abuttingly cooperable therewith.

3. An improved valve as defined in claim 1, wherein said valve member comprises an outwardly converging frusto-conically shaped valve cone member having a conical engagement surface.

4. An improved valve as defined in claim 1, wherein said valve-engageable circular valve seat engagement edge is of a compressible elastomeric material and said valve member comprises an outwardly converging frusto-conically shaped rigid valve cone member having a conical engagement surface.

5. An improved valve as defined in claim 1, wherein said valve member comprises a substantially flat cylindrical valve disc member having a flat engagement surface.

6. An improved valve as defined in claim 1, wherein said valve-engageable circular valve seat engagement edge is made of rigid material and said valve member comprises a substantially flat cylindrical compressible valve disc member having a flat compressible elastomeric engagement surface.

References Cited

UNITED STATES PATENTS

| | | | |
|---|---|---|---|
| 2,128,623 | 8/1938 | Stuck | 137—223 |
| 2,236,587 | 4/1941 | Williams | 137—223 |
| 2,255,932 | 9/1941 | Kraft et al. | 137—223 X |
| 2,309,430 | 1/1943 | Albert | 137—223 |
| 2,311,748 | 2/1943 | Gora | 137—223 |
| 2,749,931 | 6/1956 | Battin | 137—223 |

WILLIAM F. O'DEA, Primary Examiner

DENNIS H. LAMBERT, Assistant Examiner

U.S. Cl. X.R.

251—284